United States Patent [19]

Tedesco et al.

[11] Patent Number: 4,858,970
[45] Date of Patent: Aug. 22, 1989

[54] LOW PROFILE LATCH

[75] Inventors: Albert D. Tedesco, Anaheim; John C. Stammreich, Rancho Palos Verdes; Raymond E. Harmon, Orange; William R. Rourne, Jr., Redondo Beach, all of Calif.

[73] Assignee: Rexnord Holdings Inc., Torrance, Calif.

[21] Appl. No.: 134,728

[22] Filed: Dec. 18, 1987

[51] Int. Cl.⁴ .................................................. E05C 5/02
[52] U.S. Cl. ..................................... 292/113; 292/109; 292/DIG. 31
[58] Field of Search ....... 292/113, DIG. 49, DIG. 31, 292/DIG. 60, 606, 247, 256.69, 7, 111, 109

[56] References Cited

U.S. PATENT DOCUMENTS

| 1,382,322 | 6/1971 | Schleicher | 292/247 X |
|---|---|---|---|
| 1,450,365 | 4/1923 | Gray | 292/66 |
| 2,679,417 | 5/1954 | Seibert | 292/247 X |
| 2,695,803 | 11/1954 | Summers | 292/113 |
| 2,703,431 | 3/1955 | Tatom | 292/DIG. 31 X |
| 2,714,032 | 7/1955 | Summers | 292/247 |
| 2,750,217 | 6/1956 | Landholt | 292/DIG. 31 X |
| 2,800,346 | 7/1957 | Manning | 292/113 |
| 2,894,777 | 7/1959 | Hogan | 292/113 |
| 2,904,141 | 9/1959 | Henrichs | 292/113 |
| 2,927,812 | 3/1960 | Smith et al. | 292/DIG. 31 X |
| 3,214,207 | 10/1965 | Swanson | 292/66 |
| 3,534,992 | 10/1970 | Swanson | 292/113 |
| 4,053,177 | 10/1977 | Stammreich et al. | 292/DIG. 31 X |
| 4,116,479 | 9/1978 | Poe | 292/247 X |
| 4,318,557 | 3/1982 | Bourne et al. | 292/113 |
| 4,385,423 | 5/1983 | Vermilye | 292/256.69 X |
| 4,549,708 | 10/1985 | Norris | 242/129 |
| 4,602,812 | 7/1986 | Bourne | 292/DIG. 31 X |
| 4,743,052 | 5/1958 | Stammreich et al. | 292/113 |
| 4,768,815 | 9/1988 | Harmon | 292/113 |

Primary Examiner—Gary L. Smith
Assistant Examiner—Eric K. Nicholson

[57] ABSTRACT

The present invention relates to a low profile latch for joining two members of an aircraft having a keeper mounted upon one member. The latch is rotatably mounted about a mounting bushing at one end of a pair of compression links whose opposite end pivotally mounts a hook that engages the keeper. Mounted at the pivot point between the hook and compression links is a first part of a two part handle whose second part is attached from the first handle part to a pair of side plates that form a further linkage. The side plates rotate about the mounting bushing, while the opposite ends thereof are connected by control links to the hook. The further linkage formed by the cover, side plates, and control links stabilizes the handle and hook and provides a smooth, controlled movement of the hook as the handle is opened and closed.

16 Claims, 5 Drawing Sheets

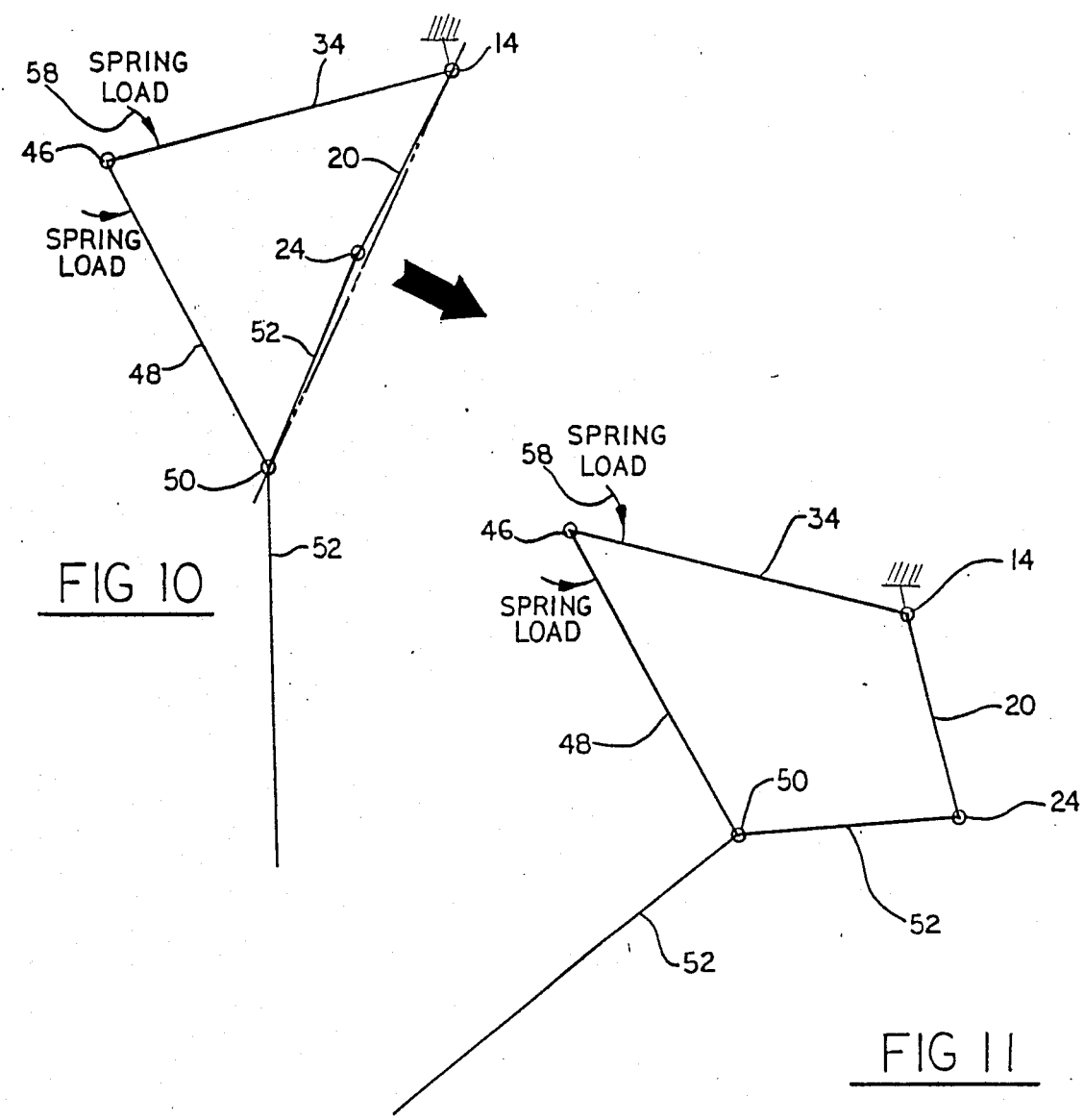

LOW PROFILE LATCH

BACKGROUND OF THE INVENTION

The present invention relates to a low profile latch and, more particularly, to a low profile, over center tension latch that may be utilized in the aircraft or aerospace industry.

Latching mechanisms are well known in the aircraft industry for joining a first member to a second member, such as a latch that joins the clamshell doors which close about an aircraft engine. An early latch that could be utilized for such a purpose is shown in U.S. Pat. No. 2,695,803 by J. M. Summers, which issued Nov. 30, 1954, and is assigned to the assignee of the present invention.

A similar latch is shown in U.S. Pat. No. 2,714,032, also by J. M. Summers, which issued July 26, 1955, also assigned to the assignee of the present invention. The two latch assemblies by Summers each require a multi-step movement of the handle in order to unlatch the hook from its keeper. Further, these prior art latches have a limited amount of hook travel.

SUMMARY OF THE INVENTION

Accordingly, it is the object of the present invention to provide a low profile latch that operates with an improved opening and closing sequence.

It is another object of invention to provide a latch which has a longer hook travel and more control over that hook travel than prior art mechanisms.

A further object is to provide a low profile latch that requires a minimum amount of penetration into the core of the aircraft when mounted thereon.

A still further object of the invention is to reduce the number of structural elements that carry a load while the latch is in its operating or closed position.

In accomplishing these and other objects there is provided a mounting bushing which attaches to one member of the aircraft. Rotatably mounted upon the mounting bushing are a pair of compression links having a first end connected to the mounting bushing and a second end connected at a pivot point to a latch hook. Also, rotatably mounted about the mounting bushing are side plates which have first and second ends extending on either side of the mounting bushing. At the first ends of the side plates are mounted control links which connect between the side plates and the latch hook. At the second ends of the side plates a cover which forms a first part of a two-part handle mechanism is pivotally connected. The cover is pivotally connected to a second handle part of the handle mechanism that, in turn, connects to the pivot point which joins the compression links to the latch hook.

The multiple linkage arrangement thus formed provides stability to the latch hook and handle. The linkage also provides a control mechanism between the handle and hook that permits one hand operation. As the handle opens, the linkage control mechanism causes the hook to move in one direction about the mounting bushing; while the handle is rotated in another direction about the bushing.

This multi-link arrangement permits the pivot point of the latch hook to move from a point on one side of a plane that passes through the mounting bushing and the keeper mechanism in a closed position to a point on the opposite side of the plane in an opened position, i.e., over center. This plane includes the load line of the latch while in the closed position. The linkage arrangement then permits the hook pivot point to move through more than 90 degrees of travel to a point beyond the mounting bushing. This arrangement provides an unusually long hook travel without penetrating the aircraft core. The multi-link configuration also allows the latch handle to be opened in a conventional manner thus eliminating operator confusion and the need to retrain that operator.

DESCRIPTION OF THE DRAWINGS

A better understanding of the present invention will be had from a review of the following specification and drawings, wherein:

FIG. 9 is a schematic diagram of the latch in a closed position;

FIG. 10 is a schematic diagram of the latch in a partially opened position; and

FIG. 11 is a schematic diagram of the latch fully opened.

DESCRIPTION OF THE PREFERRED EMBODIMENTS

Figure 1:
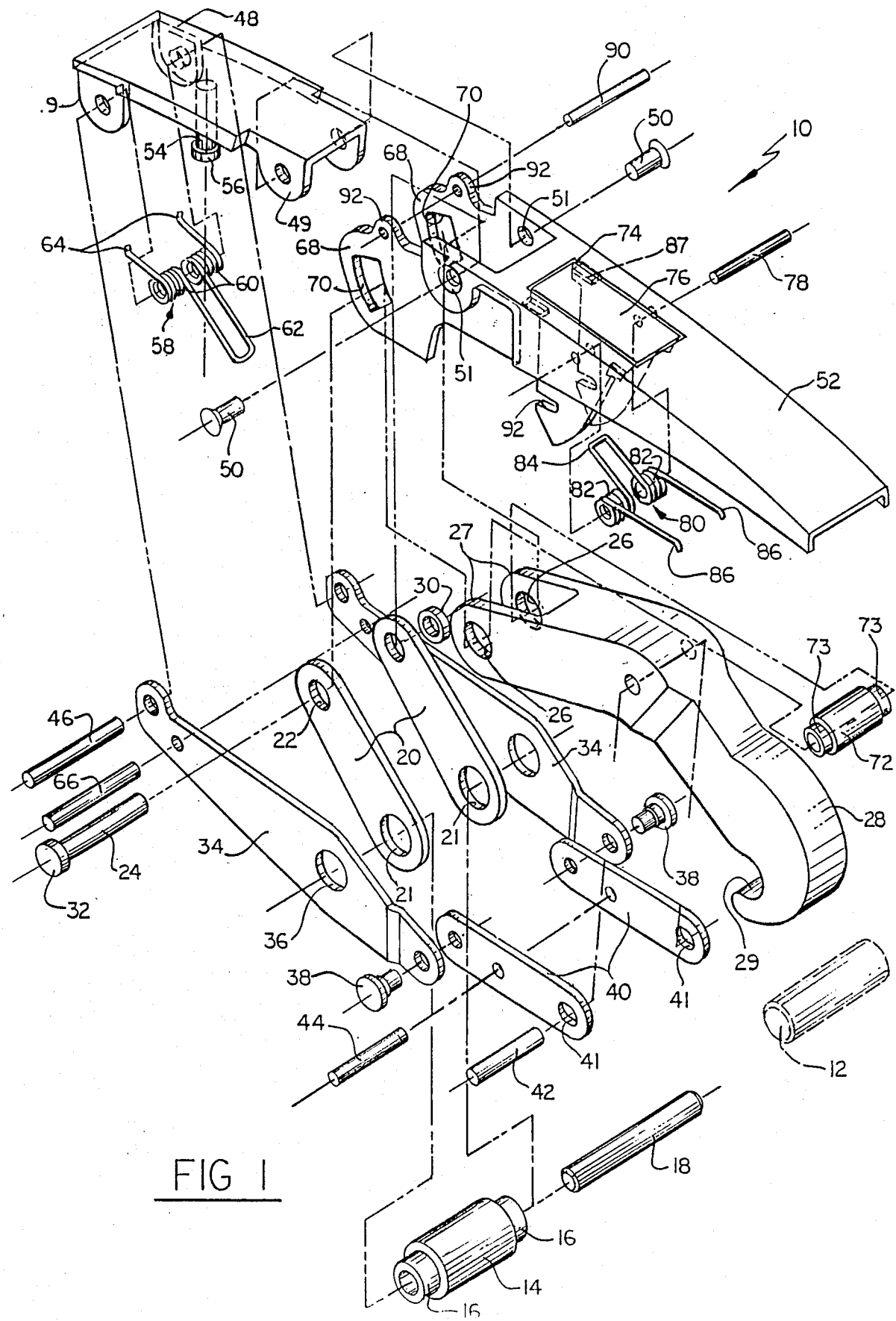
FIG. 1 is an exploded prospective view showing the components of the low profile latch of the present invention.

Referring now to the drawings, the low profile latch 10 is best seen in FIGS. 2-8 in its assembled state with progressive stages of the opening sequence shown in FIGS. 4-8. The components of the low profile latch 10 are best seen in FIG. 1 where the major components can be seen to include a conventional keeper partially shown at 12 mounted to a first aircraft member, such as, for example, a clamshell engine enclosure, not shown. Mounted to the other half of the clamshell enclosure, also not shown, is a mounting bushing 14 having opposite ends which are relieved to form shoulders 16. A pin 18 passes through the inner bore of the bushing 14 and into mounting apertures, for example, in a second aircraft member to secure the latch 10 to the second member.

A pair of compression links 20 are secured to either end of the mounting bushing 14 by shoulders 16 that control the space separating the compression links 20. The far end of links 20 are provided with apertures 22 that receive a hook pivot pin 24 which passes through apertures 26 in the bifurcated end 27 of a hook 28 and then into a washer 30. The end of hook 28 opposite the bifurcated end 27 is curved at 29 to form the hook that engages keeper 12. The end of pin 24 opposite washer 30 is provided with a flat head 32, while the washer receiving end is swaged over the washer 30 to complete the attachment of the compression links 22 to hook 28.

Also mounting on the mounted bushing 14 are a pair of side plates 34 that receive the shoulders 16 of the bushing 14 in apertures 36. The apertures 36 are slightly offset to the right from the center of the side plates 34 in FIG. 1 to receive shoulders 16 upon which are previously mounted the compression links 20. The side plates and links, 34 and 20, need not be secured to the shoulders 16 but float freely upon the shoulder to capture the bushing 14. The opposite ends of side plates 34 are each provided with first and second apertures with the first aperture in the right-hand end, FIG. 1, closest to the hook 28 receiving a flat headed, double shouldered pin 38.

The first shoulder closest to the flat head of each double pin 38 supports the first aperture within side plate 34, while the outermost shoulder supports an aperture within a control link 40. The opposite ends of control links 40 further from the side plates 34 may be provided with elongated apertures 41 to receive a rivet 42 which passes through an aperture located on the compression side of the neutral axis of the hook 28. The elongation of apertures 41 allows unimpeded movement of the control links during operation, while the control links prevent the hook from rotating freely. Located at the general mid-section of the control links 40 is a control link cross pin 44 that performs two functions, one of which is to stabilize the cross links.

At the ends of side plates 34 opposite links 40, a second set of apertures receive a cover pivot pin 46 that passes through aligned apertures within a cover 48 that forms the first part of the two-part handle mechanism. The cover 48 is generally flat and may be fabricated by stamping or casting. The cover has a U-shaped cross section at each end wherein the legs 49 of the cover receive the cover pivot pin 46 to pivotally secure the cover 48 to side plates 34. The opposite legs 49 of the cover receive a pair of pins 50 which pass through apertures 51 within a handle 52 that forms the second portion of the handle mechanism. Pins 50 thus pivotally secure the cover 48 and handle 52 to complete the handle mechanism.

Extending from the center of cover 48 toward the inner part of latch mechanism 10 is a spring post 54 having a flat head 56 on its free end. A torsional spring 58 is wound with a pair of helical coils 60 that wrap about the cover pivot pin 46 and are separated by a U-shaped arm 62 which extends from between the coil 60 about the post 54. Extending from the outer, opposite ends of coil 60 are a pair of legs 64 which engage a spring stop pin 66 that passes through the side plates 34.

Handle 52 is fabricated with a U-shaped cross section that has been bifurcated at one end to receive the hook 28. The bifurcated end of handle 52 forms two parallel hook receiving plates 68 having slots 70 therein. The leftmost slot 70 in FIG. 1 receives the flat head 32 of hook pivot pin 24, while the rightmost slot 70 receives the flat washer 30. The hook pivot pin 34 thus forms the major pivot connection of the low profile latch 10 connecting the compression links 20 and hook 28 to the handle 52. The apertures 26 in the bifurcated end of hook 28 receives a tubular pivot bushing 72 that, in turn, receives the pivot pin 24. Bushing 72 is provided with shoulders 73 which are received within the aperture 22 of compression links 20. The outer diameter of bushing 72 thus passes through the apertures 26 within hook 28 and extends just beyond to space the compression links 20 away from the outer surface of hook 28.

The latch handle 52 is provided with a rectangular aperture 74 that receives a trigger latch 76 secured to the handle by a pin 78. The trigger latch 76 is U-shaped with the pin 78 passing through each leg of the U-shaped latch to permit the trigger to pivot freely. Secured about pin 78 is a torsional spring 80 having a pair of helically wound coils 82 separated by a U-shaped arm 84 that rests against mid-section of the trigger 76. The opposite, outer ends of coils 82 have extending legs 86 which engage the inner surface of the handle 52 and urge the trigger latch 76 into its normally closed position. The trigger 76 is provided with a pair of ledges 87 that extend beyond the rectangular aperture 74 and retain the outer surface of trigger 76 flush with the same surface of handle 52.

It will be seen that the low profile latch 10 is pivotally connected by pin 24 to compression links 20 that rotate about the mounting bushing 14. Also connected at the pivot point formed by pin 24 is the handle 52. In addition to this linkage, further linkage is provided by the side plates 34 that pivot about the mounting bushing 14 and extend in opposite directions on either side therefrom. The first end of the side plates 34 connects via control links 40 to the mounting hook 28, while the opposite end connects via cover 48 to the handle 52. This complex linkage will now be described with reference to FIGS. 2-8.

Figure 2:
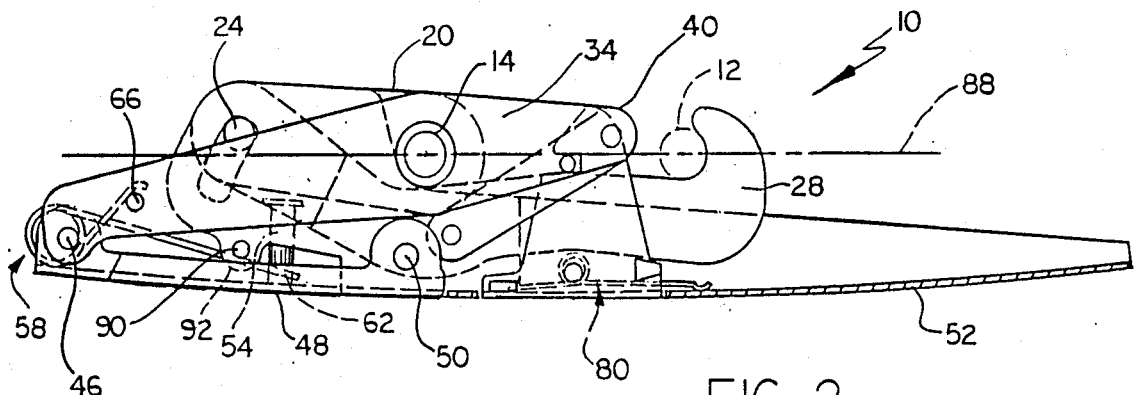
FIG. 2 is a side elevational view showing the low profile latch of FIG. 1 in an assembled and closed position.

The low profile latch shown in FIG. 2 illustrates a plane 88 formed along the center lines of the keeper 12 and mounting bushing 14. The pivot point formed by pivot pin 24 is located above the plane 88. In this position, it will be seen that the force which retains the low profile latch 10 in its locked position passes from the keeper 12 through the hook 28 as a tension force. From hook 28, the force is transferred via pin 24 and bushing 72 through the compression links 20 to the mounting bushing 14. These are the only links that carry the load when latch 10 is closed thus providing a minimal, simple load path. The remaining links formed by side plates 34, control links 40 and cover 48 are free of tension or compression loading in the closed position. In the position shown in FIG. 2, the tension force on hook 28 tends to pull the pivot point 24 in a clockwise (closed) direction for insuring that the latch forms a mechanical toggle and remains closed under stressed conditions.

When the latch 10 is closed, it will be seen that a spring engaging cross pin 90 mounted in extensions 92 extending from plates 68 of handle 52 engages the U-shaped leg 62 of spring 58 to force the spring leg 62 down along the post 54.

Figure 3:
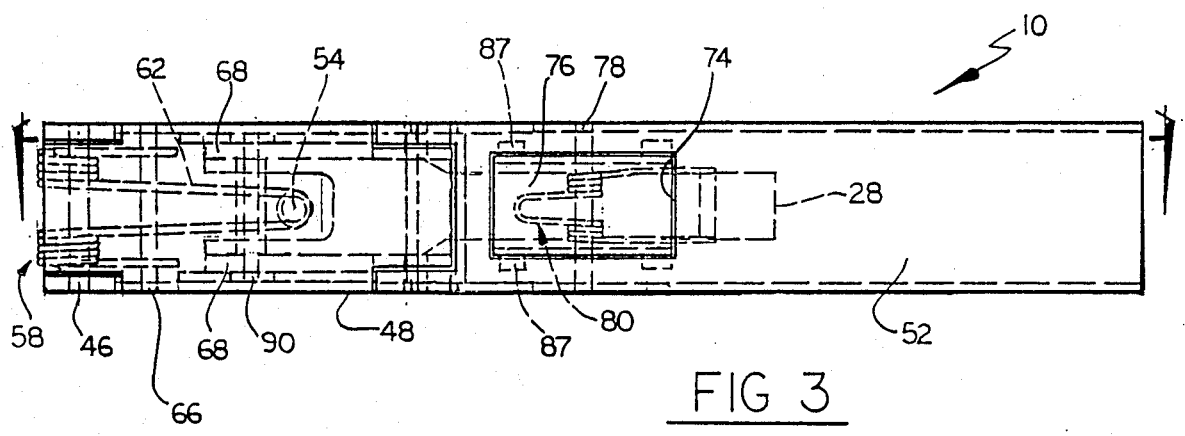
FIG. 3 is a bottom plan view of the latch of FIG. 2.

As seen in FIG. 3, the linkage mechanism fits snugly within and around the handle 52 and cover 48 which provide a smooth, continuous outer surface for a cutout in the skin of the aircraft. The reader will understand that the curvature of the cover 48, handle 52, and trigger 76 can be varied to conform to any curvature of the aircraft.

Figure 4:
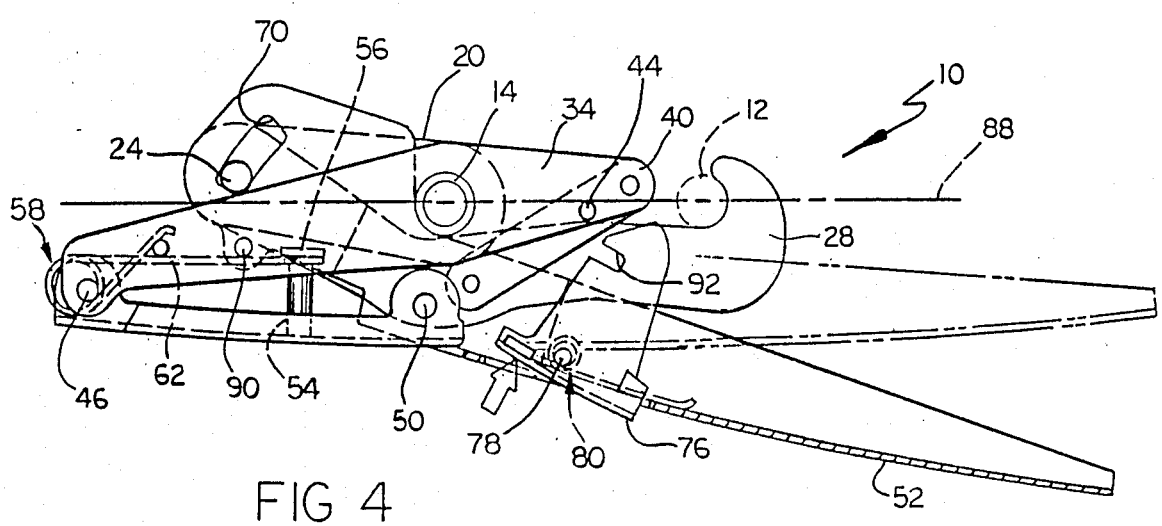
FIG. 4 is a view, similar to FIG. 2, showing the latch in a closed position with the trigger latch depressed to open the handle.

The latch 10 is opened, FIG. 4, by depressing the trigger latch 76 against the urging of its torsional spring 80. The trigger latch pivots freely about pin 78 to free a pair of slots 92 in the arms of the trigger latch 76 from the control link cross pin 44, FIG. 1, whose second function is to retain the trigger latch 76. Once freed, handle 52 is urged to its initially opened position, shown in FIG. 4, by the action of the U-shaped arm 62 of spring 58 against the spring engaging cross pin 90. The spring arm 62 travels up post 54 until it is restrained by the flat head 56 on the post. It will be noted that the low profile latch 10 is still in the locked position, as the hook pivot pin 24 is still above the plane 88.

Figure 5:
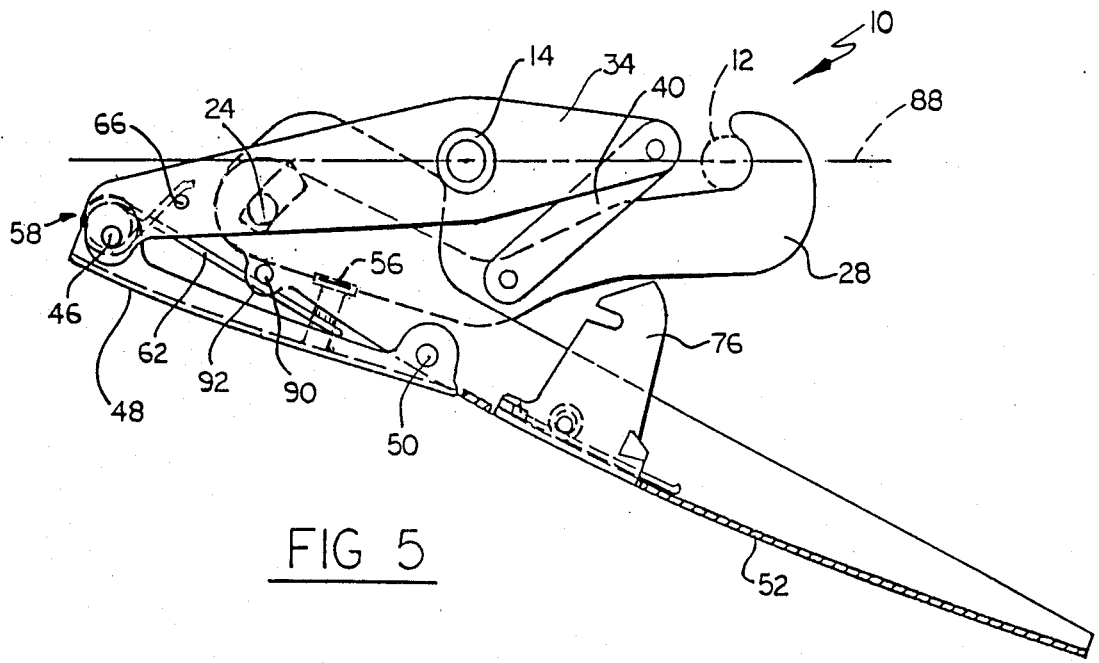
FIG. 5 is a view, similar to FIG. 4, showing the latch after it has been opened by taking it out of its over-center position.

In FIG. 5, the handle 52 has been rotated further in the clockwise direction about mounting bushing 14. However, since the handle 52 is connected by pins 50 to the cover 48, it will be seen that the clockwise rotation of the handle 52 will cause the pivot pin 24 to rotate in a counterclockwise direction about mounting bushing 14 from one side of plane 88 to the other. This takes the hook of the low profile latch 10 out of its over-center or toggle position and releases the load between the latch 10 and keeper 12.

Figure 6:
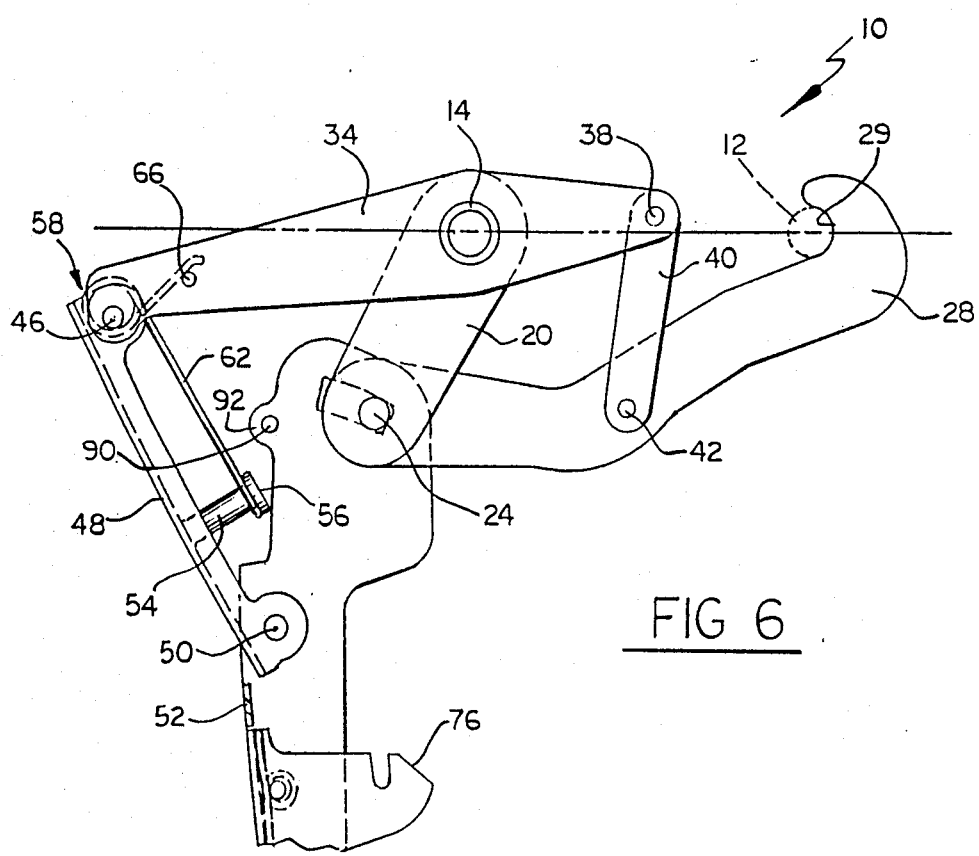
FIG. 6 is a view similar to FIG. 5, showing the latch further opened.
Figure 7:
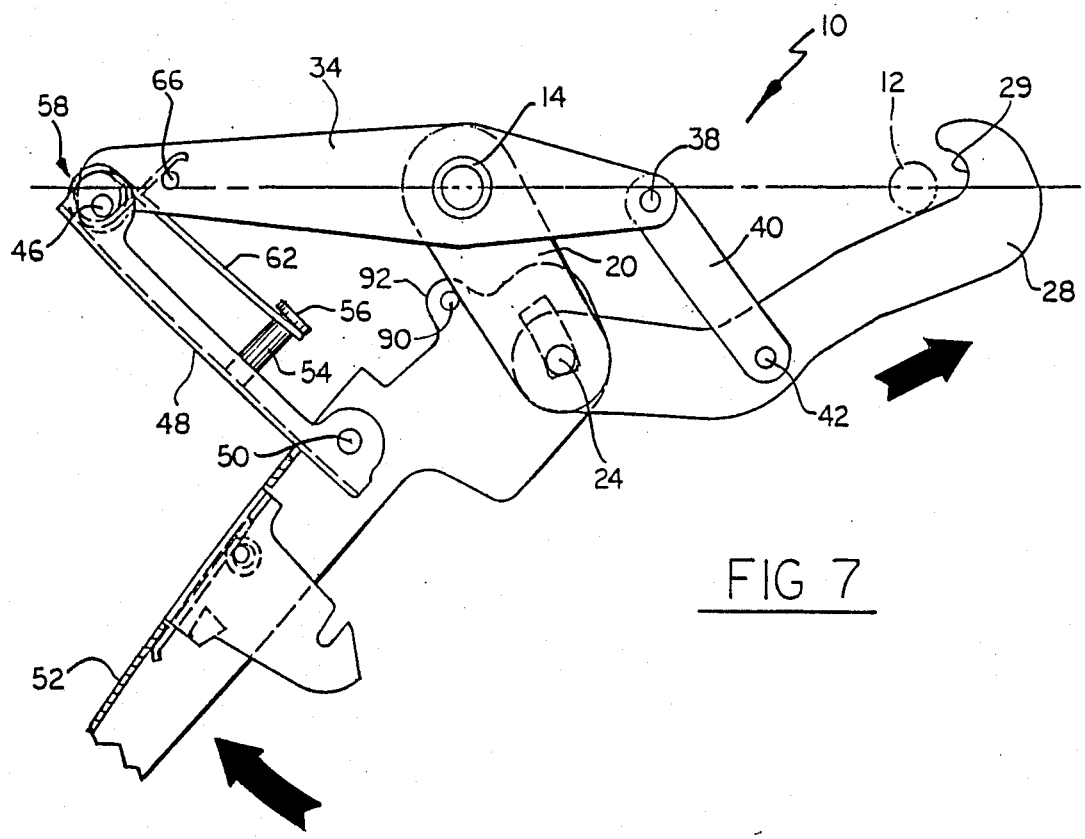
FIG. 7 is a view, similar to FIG. 6, showing the latch fully opened and the hook disengaging from the keeper.

FIG. 6 shows the handle 52 rotated further in the clockwise direction about mounting bushing 14. It will be seen in FIGS. 5 and 6 that the cover 48 and side plates 34 play an important part in the force transfer which causes the opening of hook 28. Without the presence of these two members, the handle 56 would simply pivot about pivot pin 24 without impairing a motion of the hook 28. However, because cover 48 prevents the free clockwise rotation of handle 52, the clockwise rotational motion and force applied to handle 52 is transferred at cover pin 50 to pin 24 as a counterclockwise motion that causes the hook 28 to move in a counterclockwise direction about the mounting bushing 14. This is best seen in FIG. 7 where the latch 10 is shown in its full opened position. Note here that the cross pin 90 which engages spring 58 also functions to limit the travel of handle 52 by engaging the compression links 20, FIGS. 7 and 8.

Figure 8:
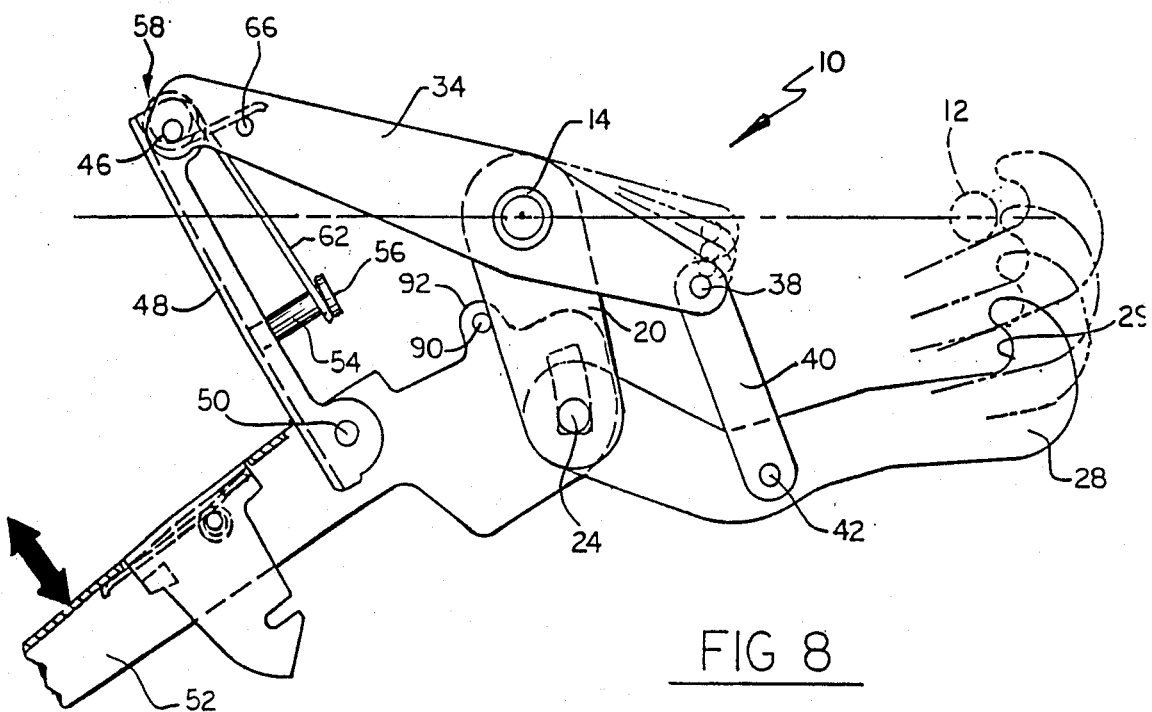
FIG. 8 is a view, similar to FIG. 7, showing the rotation of the latch about the mounting bushing after the hook is disengaged from the keeper.

Once the latch 10 is in its fully open position as shown in FIGS. 7 and 8, the handle 52 may be rotated to lift the curved hook portion 29 of hook 28 from the keeper 12. It will be seen that the U-shaped arm 62 of the torsional spring 58 engages the flat head 56 on post 54 for urging the cover 48 in a counterclockwise direction about cover pivot pin 46 to retain the latch 10 in an open position. This open retention permits movement of the handle 52 to be transferred directly into movement of hook 28. When the low profile latch 10 is to be closed, it will be seen from FIG. 8 that a counterclockwise motion of handle 52 will cause the latch 28 to be lifted to a point to the right of keeper 12. Further rotation in a counterclockwise direction of handle 52 will cause the hook 28 to rotate in a clockwise direction for closing upon keeper 12. This movement is shown in FIG. 7 with the motion of the handle 52 and hook 28 opposing the arrows shown therein. Further rotation for closing the latch 10 is shown in FIGS. 6 and 5, respectively, until a final closure is accomplished as shown in FIG. 2.

A clearer understanding of the opening and closing sequence of the latch 10 may be obtained by reference to FIGS. 9-11. In FIG. 9, the multi-level arrangement is schematically shown in a closed position (similar to FIGS. 2 and 3) with the hook pivot pin 24 on one side of the plane 88. The crossed linkage of handle 52 and side plates 34 can be seen. The crossed linkage allows the handle 52 to rotate in one direction about mounting bushing 14, while the hook connected at pivot point 24 rotates in the opposite direction during opening. It can also be seen that the spring force from spring 58 helps to urge the latch 10 over center (pin 24 on one side of plane 88).

FIG. 10 (similar to FIG. 6) shows the crossed linkage in its partially opened position. Note here that, as the pivot pin 24 passes the line between mounting bushing 14 and cover pins 50, the spring force from spring 58 switches from urging the closure of the latch 10 to urging the latch into an opened position. In FIG. 11 (similar to FIGS. 7 and 8), the latch 10 is shown fully opened with spring 58 holding the multi-link arrangement in that opened position against pin 90 (see FIGS. 7 and 8).

The present invention utilizes a complex linkage which permits the latch handle 52 to move in one direction, while the hook 28 moves in the other direction about the mounting bushing 14. Because of the unique arrangement, it will be seen that the entire latch mechanism is located on one side of the mounting bushing 14 for limiting the amount of penetration the low profile latch 10 requires into the aircraft core. Further, the unique linkage arrangement permits a significantly longer travel for the curved end 29 of hook 28. While the present invention has been described with a particular arrangement of the linkage mechanisms, it will be understood that other variations are possible within the appended claims.

We claim:

1. A low profile aircraft latch for joining one aircraft member to a second aircraft member, one of said members mounting a keeper, comprising:
   a hook for engaging said keeper;
   a mounting bushing;
   a single pair of compression links connecting said mounting bushing to said hook at a pivot point;
   a handle means joined to said hook at said pivot point;
   a pair of side plates pivoted about said mounting bushing having first and second opposing ends extending to either side of said mounting bushing;
   a pair of control links connecting said first opposing end of said side plates to said hook; and
   said handle means connected to said second opposing ends of said side plates, whereby an arcuate movement of said handle means causes a controlled movement of said hook.

2. A low profile latch, as claimed in claim 1, wherein said handle means, comprises:
   a two-piece unit having a first handle portion connected to said compression links at said pivot point; and
   a cover portion connecting said second opposing ends of said side plates to said handle, said cover stabilizing said handle and providing an opening and closing force thereto at said pivot point.

3. A low profile latch, as claimed in claim 1, wherein:
   said mounting bushing and said keeper having longitudinal axes which form a plane having said pivot point on one side of said plane when said latch is closed and on the other side of said plane when said latch is open.

4. A low profile latch, as claimed in claim 1, wherein:
   said hook, said compression links, said handle means, said side plates, and said control links form a multiple linkage wherein an arcuate movement of said handle in one direction about said mounting bushing causes said hook to move in an opposition direction.

5. A low profile latch, as claimed in claim 2, additionally comprising:
   a trigger latch mounted in said handle;
   spring means mounted between said cover and said side plates to urge said handle into an initial open position when said trigger latch is opened;

said spring means further urging said handle and said hook into a maximum extended position when said latch is fully opened.

6. A low profile latch, as claimed in claim 1, wherein:
a load from said keeper to said hook is transferred to said compression links and then to said mounting bushing; and
said side plates and said control links are load free where said latch is in a closed position.

7. A low profile latch for joining two members having a keeper mounted upon one member and the latch mounted upon the other, said latch comprising:
a mounting bushing adapted to be mounted upon said other member;
a pair of links having first and second ends, each link connected at its respective first end to said mounting bushing;
a hook connected to said second ends of said links at a pivot point for pivoting about said pivot point as said links pivot about said mounting bushing;
a handle connected to said hook and links at said pivot point; and
further linkage means connecting said mounting bushing, said handle and said hook for moving said hook in one direction about said mounting bushing while said handle moves in the opposite direction about said mounting bushing.

8. A low profile latch, as claimed in claim 7, wherein:
said links are compression links which receive a load from said hook and pass said load to said mounting bushing; and
said further linkage means are load free while said latch is closed.

9. A low profile latch, as claimed in claim 7, wherein said further linkage means additionally comprises:
a pair of side plates pivoted about said mounting bushing having first and second opposing ends extending to either side of said bushing;
a pair of control links connecting said first ends of said side plates to said hook; and
a cover connecting said second ends of said side plates to said handle.

10. A low profile latch, as claimed in claim 9, additionally comprising:
a trigger latch mounted in said handle;
spring means mounted between said cover and said side plates to urge said handle into an initial opened position after said trigger latch is opened and to further urge said handle and said hook into a maximum opened position after said latch is opened.

11. A low profile latch, as claimed in claim 9, additionally comprising:
a post connected to said cover;
said spring means wrapped about and thus connected to said post to slide up and down said post as said latch is opened and closed; and
said handle having a cross pin that engages said spring means and moves said spring means up said post when said handle is rotated closed, whereby said spring means urges said handle into an initial opened position when said trigger latch is opened.

12. A low profile latch for joining one member which mounts a keeper to a second member which mounts said latch, comprising:
a mounting bushing for mounting said latch;
compression linkage means pivoted about said mounting bushing;
a hook pivoted about said compression linkage means at an end of said compression linkage means opposite from said mounting bushing;
said plate means pivoted about said mounting bushing having first and second opposing ends extending to either side of said bushing;
control linkage means pivotally connected at one end to said first end of said side plate means and at the other end to said hook;
a handle pivotally connected to said hook and said compression linkage means; and
a cover pivotally connected at one end to said second end of said side plate means and at the other end to said handle.

13. A low profile latch, as claimed in claim 12, wherein:
said compression linkage means, said side plate means, and said control linkage means each include a pair of compression links, a pair of side plates, and a pair of control links.

14. A low profile latch, as claimed in claim 12, additionally comprising:
spring means mounted between said side plate means and said cover to urge said latch into an open position.

15. A low profile latch, as claimed in claim 12, wherein:
said compression linkage means, said hook, said side plate means, said control linkage means, said handle, and said cover of said latch are mounted substantially on one side of said mounting bushing.

16. A low profile latch, as claimed in claim 12, wherein:
a movement of said handle in one direction about said mounting bushing causes an opposite movement of said hook about said mounting bushing.

* * * * *